(12) United States Patent
Kim et al.

(10) Patent No.: US 9,448,720 B2
(45) Date of Patent: Sep. 20, 2016

(54) MOBILE TERMINAL AND CONTROL METHOD THEREOF

(71) Applicant: LG ELECTRONICS INC., Seoul (KR)

(72) Inventors: Sangbo Kim, Seoul (KR); Hyomoon Cho, Seoul (KR); Byeongyul Kim, Seoul (KR); Minwoo Kang, Seoul (KR); Yeonghoon Jo, Seoul (KR); Dongha Lee, Seoul (KR); Yoonjun Park, Seoul (KR); Unah Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/555,095

(22) Filed: Nov. 26, 2014

(65) Prior Publication Data

US 2015/0153946 A1 Jun. 4, 2015

(30) Foreign Application Priority Data

Dec. 2, 2013 (KR) .......................... 10-2013-0148692

(51) Int. Cl.
*G06F 3/041* (2006.01)
*G06F 3/0488* (2013.01)

(52) U.S. Cl.
CPC ......... *G06F 3/04883* (2013.01); *G06F 3/0416* (2013.01)

(58) Field of Classification Search
CPC .............................. G06F 3/041–3/04897; G06F 2203/04101–2203/04113; G06F 2203/04808

USPC .......... 345/173–178; 178/18.01–18.09, 18.11
See application file for complete search history.

(56) References Cited

U.S. PATENT DOCUMENTS

| | | | |
|---|---|---|---|
| 2010/0048194 A1* | 2/2010 | Park | G06F 1/1626 455/418 |
| 2013/0042209 A1* | 2/2013 | de Leon | G06F 3/017 715/863 |
| 2013/0053105 A1* | 2/2013 | Lee | H04M 1/673 455/565 |
| 2013/0067376 A1* | 3/2013 | Kim | G06F 21/36 715/769 |
| 2014/0006965 A1* | 1/2014 | Xu | G06F 3/048 715/741 |
| 2014/0066017 A1* | 3/2014 | Cho | H04M 1/72519 455/411 |
| 2014/0162605 A1* | 6/2014 | Dwarkaprasad | H04W 12/08 455/411 |
| 2014/0365904 A1* | 12/2014 | Kim | G06F 3/0484 715/741 |
| 2015/0128120 A1* | 5/2015 | Han | G06F 9/44505 717/168 |

* cited by examiner

*Primary Examiner* — Stephen Sherman
(74) *Attorney, Agent, or Firm* — Lee, Hong, Degerman, Kang & Waimey; Jonathan Kang; Harry Lee

(57) ABSTRACT

Disclosed are a touch-input recognizable mobile terminal, and a method for controlling the same. The mobile terminal, which is in a locked state for restricting reception of a user's control command, includes: a body; a sensing unit configured to sense a posture of the body; a display unit configured to output a lock screen in the locked state; and a controller configured to convert the locked state into a released state, if a touch for releasing the locked state is applied to the display unit, wherein the controller performs one or more controls related to at least one of the locked state and the released state, according to a posture of the body sensed upon input of the touch.

20 Claims, 21 Drawing Sheets

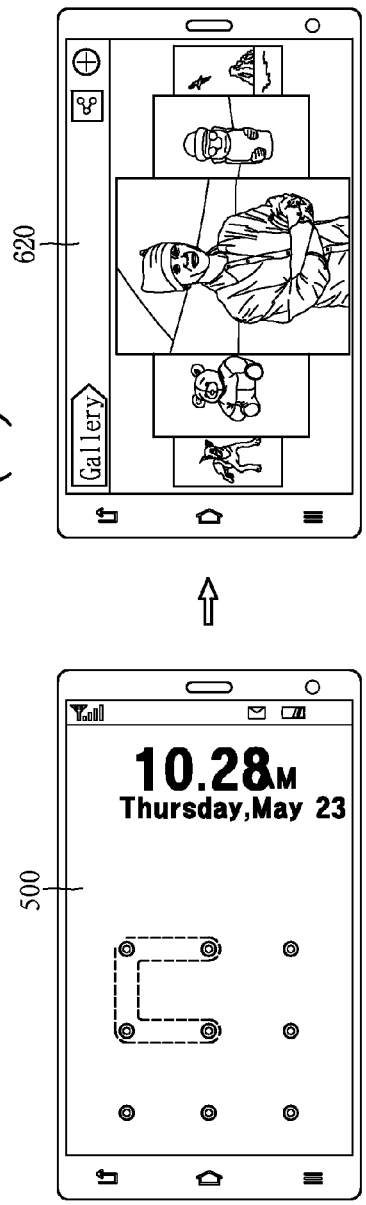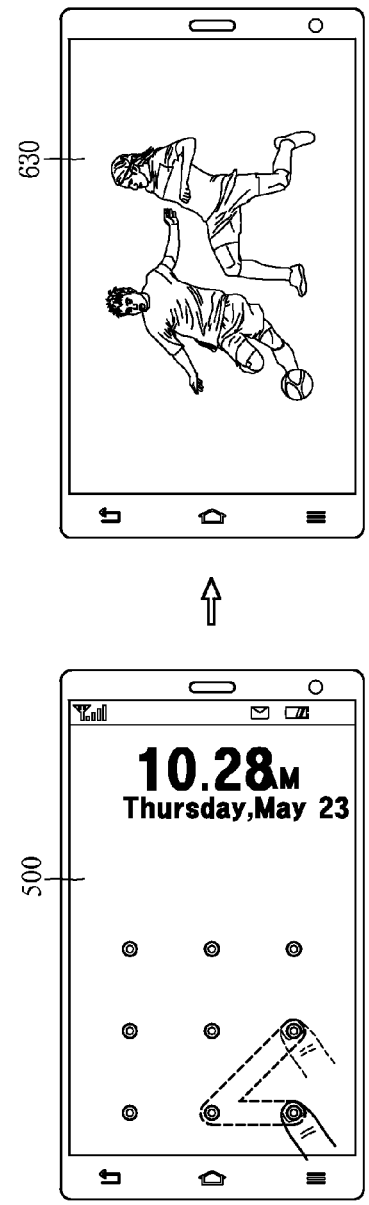
FIG. 6B(a)
FIG. 6B(b)

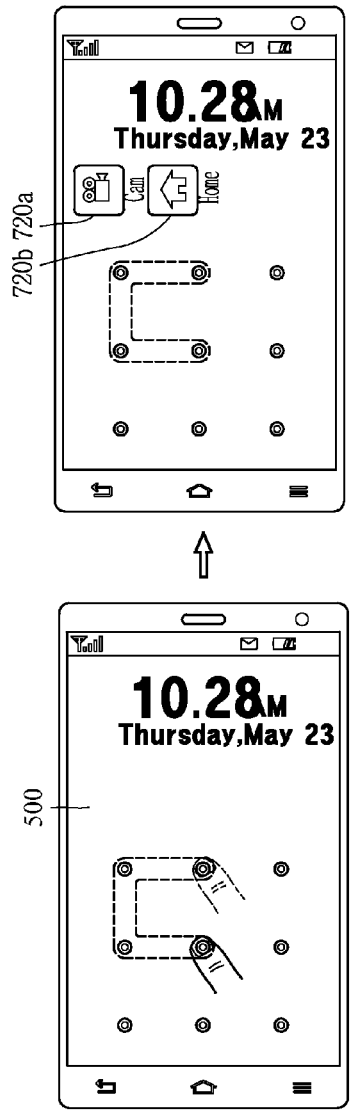
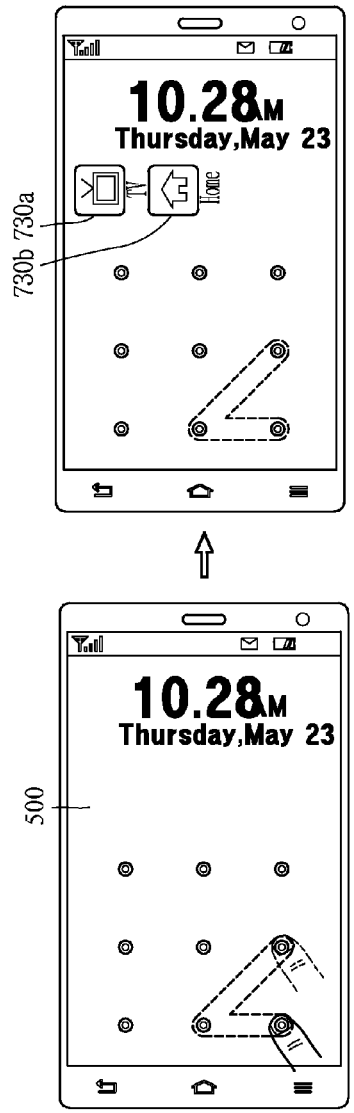

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0148692, filed on Dec. 2, 2013, the contents of which is incorporated by reference herein in its entirety.

BACKGROUND OF THE DISCLOSURE

1. Field of the Disclosure

The present disclosure relates to a mobile terminal, and more particularly, to a touch-input recognizable mobile terminal, and a method for controlling the same.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

With development of a mobile terminal having a touch screen on which a touch input is recognizable, the mobile terminal may be in a locked state for restricting touch recognition. In the conventional art, there have been provided only methods for entering a home screen page upon release of a locked state.

SUMMARY OF THE DISCLOSURE

Therefore, an aspect of the detailed description is to provide a method for performing various controls when a locked state of a mobile terminal is released.

Another aspect of the detailed description is to provide a method for directly executing a specific function without entering a home screen page, when a locked state of a mobile terminal is released.

Still another aspect of the detailed description is to provide a method for executing functions associated with a screen size of a display unit.

To achieve these and other advantages and in accordance with the purpose of this specification, as embodied and broadly described herein, there is provided a mobile terminal which is in a locked state for restricting reception of a user's control command, the mobile terminal comprising: a body; a sensing unit configured to sense a posture of the body; a display unit configured to output a lock screen in the locked state; and a controller configured to convert the locked state into a released state, if a touch for releasing the locked state is applied to the display unit, wherein the controller performs one or more controls related to at least one of the locked state and the released state, based on a posture of the body sensed upon input of the touch.

In an embodiment, the controller may be configured to convert the locked state into a released state, upon input of the touch for releasing the locked state. The controller may be configured to perform a first control when the body has a first posture, and to perform a second control when the body has a second posture.

In an embodiment, a posture of the body may be determined based on a virtual axis set on the basis of a gravitational direction. The first posture may be a posture where a first direction of the body is parallel to the virtual axis. And the second posture may be a posture where the first direction of the body is perpendicular to the virtual axis.

In an embodiment, when the body has the first posture, the controller may output a home screen page to the display unit. On the other hand, when the body has the second posture, the controller may execute applications associated with the second posture.

In an embodiment, the applications associated with the second posture may be applications requiring an output area wide in a horizontal direction.

In an embodiment, the first control and the second control may be controls for executing different applications when the locked state is converted into a released state.

In an embodiment, if the body has the first posture, the controller may execute applications related to the first posture among applications installed at the mobile terminal. On the other hand, if the body has the second posture, the controller may execute applications related to the second posture among applications installed at the mobile terminal.

In an embodiment, the touch for releasing the locked state may be a preset pattern input. After input of the touch for releasing the locked state, the controller may output a graphic object corresponding to an executable application among applications installed at the mobile terminal.

In an embodiment, if the body has the first posture, the controller may output graphic objects corresponding to applications related to the first posture. On the other hand, if the body has the second posture, the controller may output graphic objects corresponding to applications related to the second posture.

In an embodiment, after input of the touch for releasing the locked state, the controller may output the graphic objects in an overlapping manner, to part of the lock screen, without directly releasing the locked state.

In an embodiment, the executable application may be provided in plurality in number. Once a preset touch is applied to one of a plurality of graphic objects corresponding to the plurality of executable applications, the controller may release the locked state, and may execute an application corresponding to the graphic object to which the touch has been applied.

In an embodiment, one of the graphic objects corresponding to the plurality of executable applications may be a graphic object for entering a home screen page.

In an embodiment, the mobile terminal may further include a memory configured to store therein a plurality of preset patterns for releasing a locked state. The controller may sense a posture of the body when one of the plurality of preset patterns has been applied. And the controller may output graphic objects corresponding to said one preset pattern to part of the lock screen in an overlapping manner, based on the sensed posture of the body.

In an embodiment, one of the plurality of preset patterns may be a pattern for entering a home screen page.

In an embodiment, if the touch applied to the display unit corresponds to none of the plurality of preset patterns, the controller may not release the locked state.

In an embodiment, the mobile terminal may further comprise a position receiving unit configured to receive position information of the body, and the controller may execute a function related to the position information when the locked state is released.

To achieve these and other advantages and in accordance with the purpose of this specification, as embodied and broadly described herein, there is also provided a method for controlling a mobile terminal which is in a locked state for restricting reception of a user's control command, the method comprising: sensing a posture of a body of the mobile terminal; outputting a lock screen related to the locked state; applying a touch for releasing the locked state to the lock screen; and converting the locked state into a released state upon input of the touch for releasing the locked state, and performing one or more controls related to at least one of the locked state and the released state, based on a posture of the body sensed upon input of the touch.

In an embodiment, a posture of the body may be determined based on a virtual axis set on the basis of a first direction of the body. In the step of performing one or more controls, one or more controls may be performed based on a tilted angle of the mobile terminal with respect to the virtual axis.

In an embodiment, in the step of performing one or more controls, if an angle between the body and the virtual axis is a preset angle, a function corresponding to the preset angle may be executed.

In an embodiment, the touch for releasing the locked state may be a preset pattern input. After input of the touch for releasing the locked-state, a graphic object, which corresponds to a preset function executable in a posture of the body, may be output to the lock screen in an overlapping manner.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present invention. Therefore, the suffixes do not have different meanings from each other. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
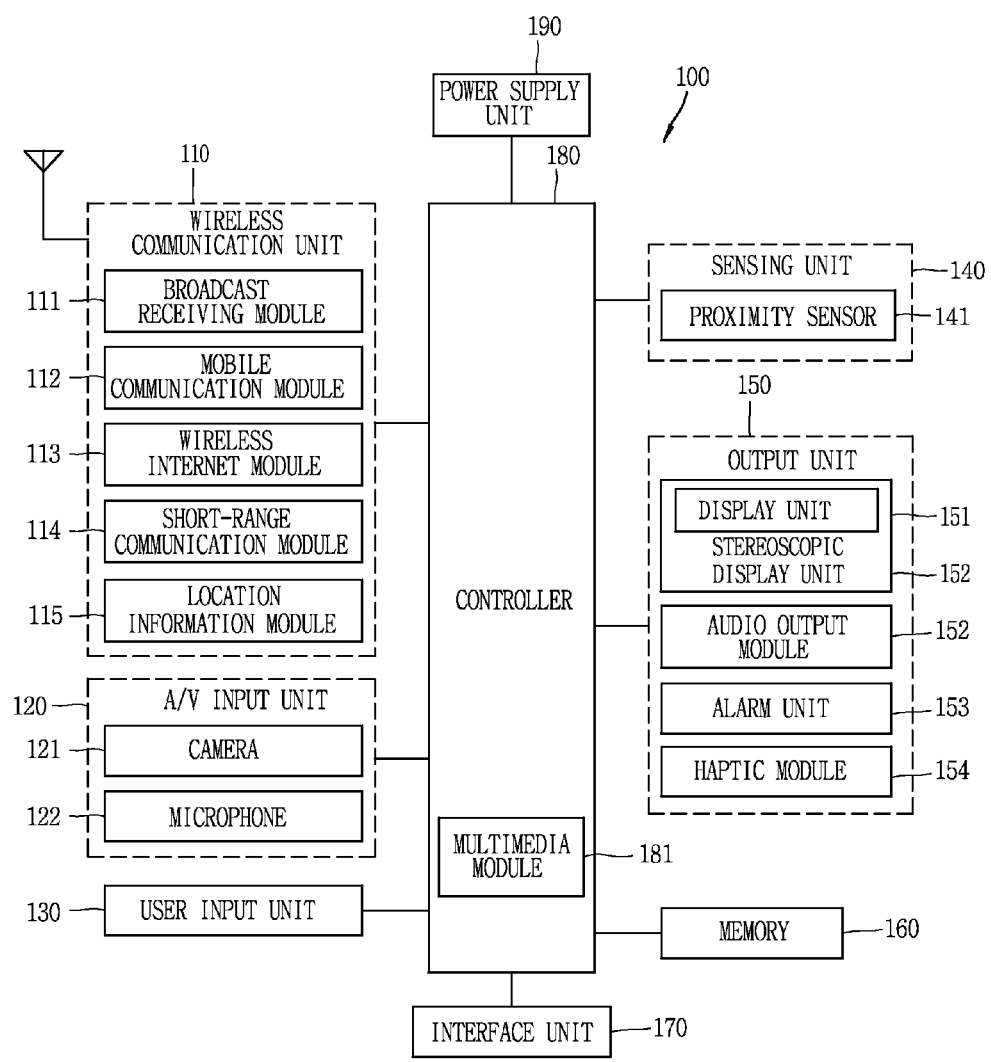
FIG. 1 is a block diagram of a mobile terminal according to an embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), Zig-Bee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the NV input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output unit 153, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, the proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output unit 153 may output audio data received from the radio communication unit 110 or stored in the memory 160 in a call signal reception mode, a call mode, a record mode, a voice recognition mode, a broadcast reception mode, and the like. Also, the audio output unit 153 may provide audible outputs related to a particular function (e.g., a call signal reception sound, a message reception sound, etc.) performed in the mobile terminal 100. The audio output unit 153 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display unit 151 or the voice output module 152. Therefore, the display unit 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
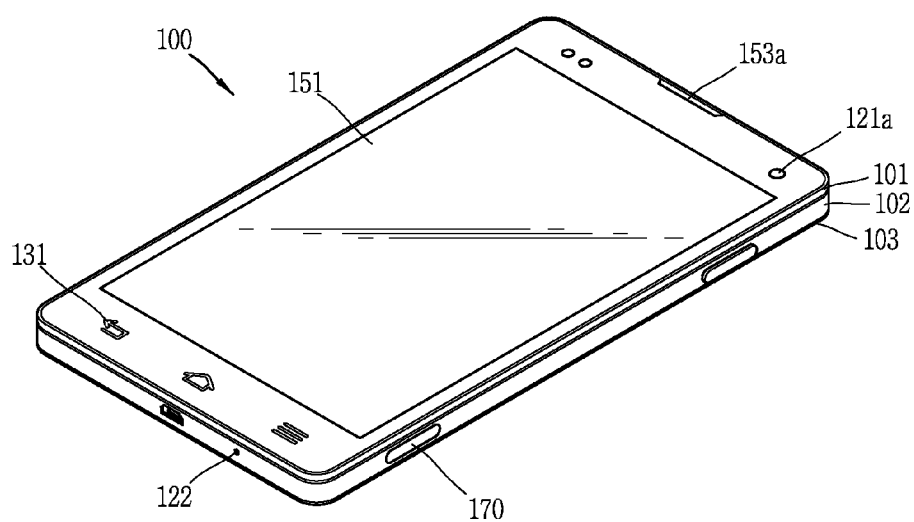
FIGS. 2A and 2B are perspective views of a mobile terminal according to an embodiment of the present invention.
Figure 2B:
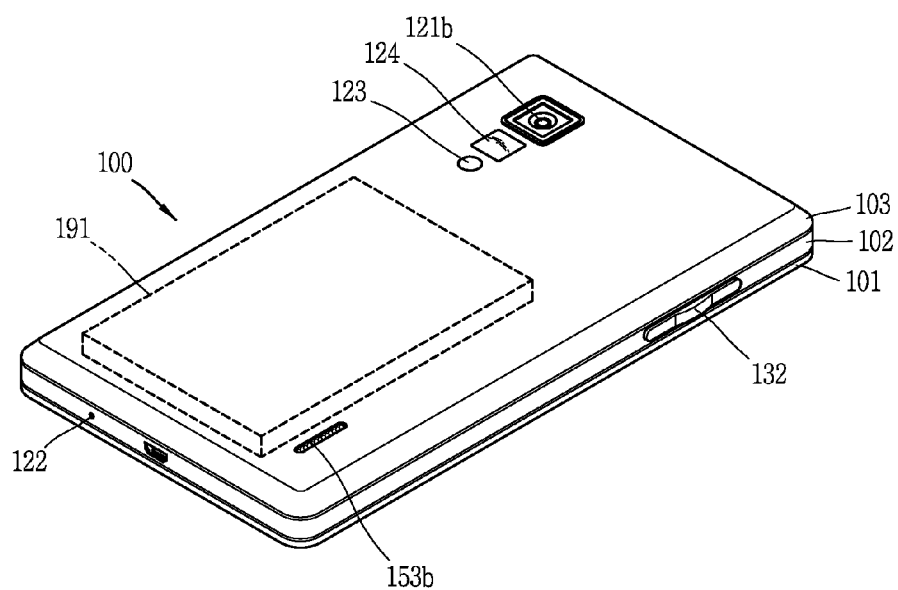

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 153, a camera 121, user input units 131, 132, 133, etc.

The display unit 151 occupies most parts of a main surface of the front case 101. The audio output unit 153 and the camera 121 are arranged at two ends of display unit 151.

Various types of visual information may be displayed on the display unit 151. Such information may be displayed in the form of texts, numbers, symbols, graphics, icons, etc.

For input of such information, at least one of texts, numbers, symbols, graphics and icons are arranged in the form of a keypad. Such keypad may be called 'SOFT KEYS'.

The display unit 151 may be entirely operated, or partially operated as the entire region is divided into a plurality of regions. In the latter case, the plurality of regions may be operated in an associated manner.

The user input unit 130 is manipulated to receive a command for controlling the operation of the mobile terminal 100, and may include a plurality of manipulation units 131, 132, 133. The manipulation units 131, 132, 133 may be referred to as manipulating portions, and may include any type of ones that can be manipulated in a user's tactile manner.

Commands inputted through the first to third user input units 131, 132, 133 may be variously set. For instance, the first manipulation unit 131 is configured to input commands such as START, END, SCROLL or the like. The first manipulation unit 131 is disposed at a region adjacent to one end of the display unit 151. Said one end is opposite to another end of the display unit 151 where the audio output unit 153 is disposed.

The second manipulation unit 132 and the third manipulation unit 133 are configured to input commands for controlling a level of sound outputted from the audio output unit 153, or commands for converting the current mode of the display unit 151 to a touch recognition mode.

Referring to FIG. 2B, a camera 121b may be additionally provided on the rear case 102. The camera 121b faces a direction which is opposite to a direction faced by the camera 121a (refer to FIG. 2A), and may have different pixels from the camera 121a.

For example, the camera 121a may operate with relatively lower pixels (lower resolution). Thus, the camera 121a may be useful when a user can capture his face and send it to another party during a video call or the like. On the other hand, the camera 121b may operate with a relatively higher pixels (higher resolution) such that it can be useful for a user to obtain higher quality pictures for later use. The cameras 121a and 121b may be installed at the body so as to rotate or pop-up.

A flash 123 and a mirror 124 may be additionally disposed adjacent to the camera 121b. The flash 123 operates in conjunction with the camera 121b when taking a picture using the camera 121b. The mirror 124 can cooperate with the camera 121b to allow a user to photograph himself in a self-portrait mode.

Referring to FIG. 2B, an audio output unit 153b may be additionally disposed at the rear case 102. The audio output unit 153b may implement a stereo function together with the audio output unit 153a (refer to FIG. 2A), and may be used for calling in a speaker phone mode.

A broadcast signal receiving antenna as well as an antenna for calling may be additionally disposed on the side surface of the terminal body. An antenna, part of the broadcast receiving module 111 (refer to FIG. 1) may be installed to be retractable into the terminal body.

The microphone 122, the interface unit 170, etc. may be provided at the body. The microphone 122 is disposed at a region adjacent to one end of the display unit 151. Said one end is opposite to another end of the display unit 151 where the audio output unit 153 is disposed.

The user input units 132, 133, a connection port, etc. may be arranged on side surfaces of the front case 101 and the rear case 102.

The connection port is configured to receive data or power from an external device, and to transmit it to each component inside the mobile terminal 100. Alternatively, the connection port is configured to transmit data inside the mobile terminal 100 to an external device. The connection port may be one example of the interface unit 170 (refer to FIG. 1).

A power supply unit 190 for supplying power to the mobile terminal 100 is mounted to the body. The power supply unit 190 may be mounted in the body, or may be detachably mounted to the body.

In a case where the mobile terminal according to an embodiment of the present invention which can include at least one of the above components is in a locked state for restricting reception of a user's control command, the mobile terminal may perform one or more controls according to a control command for releasing the locked state.

Figure 3:
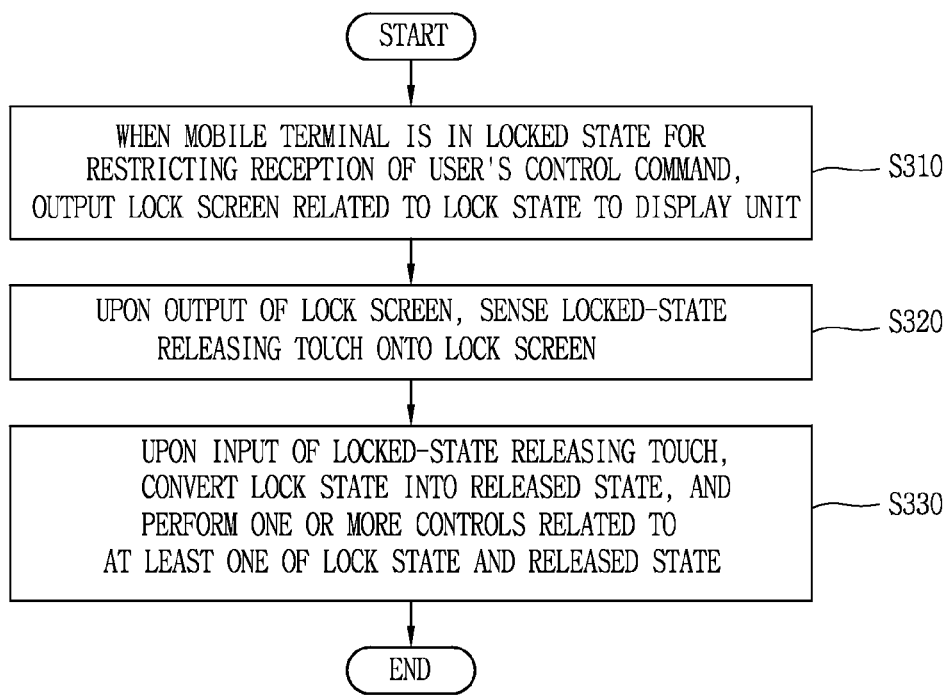
FIG. 3 is a flowchart for explaining a method for controlling a mobile terminal which is in a locked state.
Figure 4A:
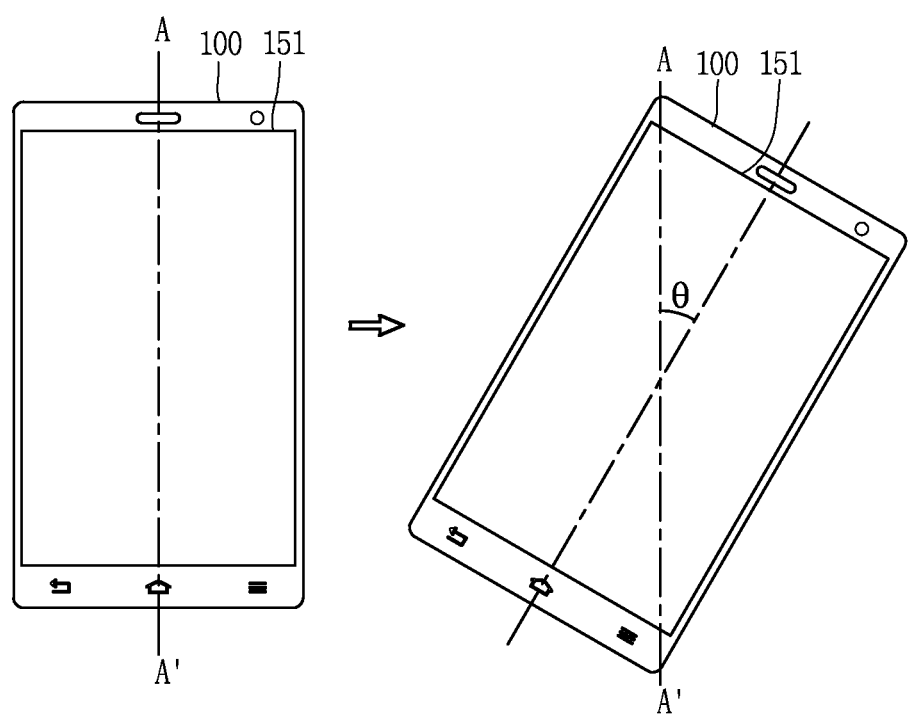
FIGS. 4A, 4B(a), 4B(b), 4B(c) and 4B(d) are conceptual views for explaining a posture of a mobile terminal according to an embodiment of the present invention.
Figure 4B:
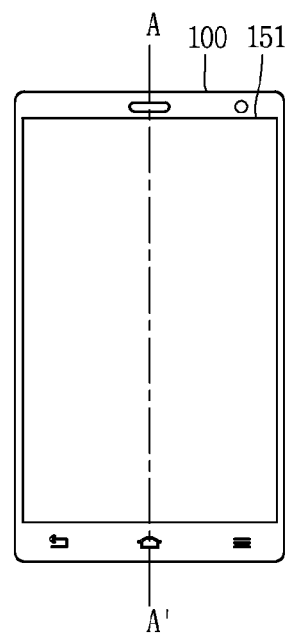
Figure 4B:
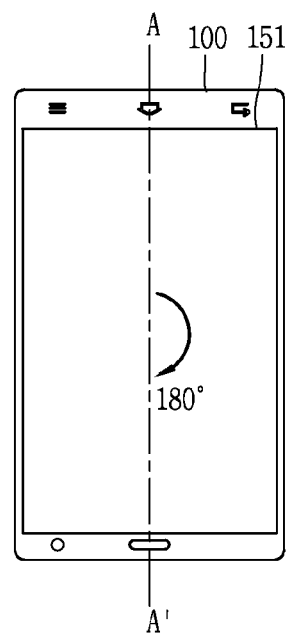
Figure 4B:
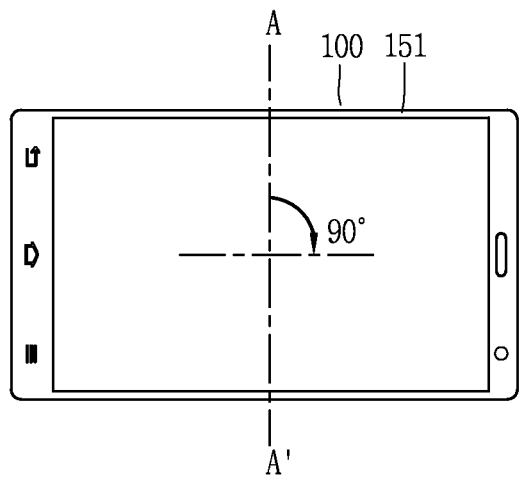
Figure 4B:
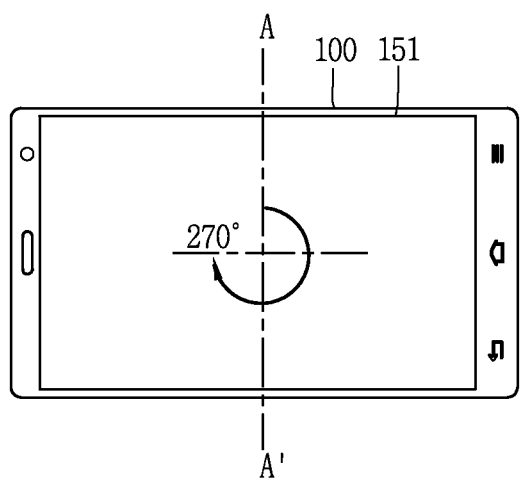

FIG. 3 is a flowchart for explaining a method for controlling a mobile terminal according to an embodiment of the present invention, based on a posture of a body, upon release of a locked state. FIGS. 4A and 4B are conceptual views for explaining a posture of a mobile terminal according to an embodiment of the present invention. FIGS. 5A to 5E are conceptual views for explaining a control method of FIG. 3.

When a mobile terminal according to an embodiment of the present invention is in a locked state for restricting reception of a user's control command, a lock screen 500 associated with the locked state may be output to the display unit 151 (S310).

In the mobile terminal of which front surface is implemented as the display unit 151 (or touch screen), sensing of touch on the display unit 151 may be restricted. A state where sensing of touch on the display unit 151 is restricted may be defined as a locked state.

In the locked state, reception of a user's control command with respect to the mobile terminal may be restricted. For instance, reception of various control commands related to operations executable in the mobile terminal, such as a user's touch command, voice command and gesture command, may be restricted in the locked state.

In the locked state, functions which have been executed before the locked state may be continuously performed.

If a preset input is sensed when the mobile terminal is in a locked state, the display unit 151 may be activated (or turned on), and the lock screen 500 related to the locked state may be output to the display unit 151.

The preset input for activating the display unit 151 may be an input for pressing a manipulation unit of the mobile terminal (e.g., a push key 132 provided on the side surface of the mobile terminal), or an input for applying a preset touch (e.g., double touch on one region of the display unit 151).

Screen information for releasing a locked state may be output to the lock screen 500. For instance, the screen information may be configured as a plurality of graphic objects for receiving a touch for releasing the locked state.

Upon output of the lock screen 500, a touch for releasing the locked state onto the lock screen 500 may be sensed (S320).

The controller 180 may convert the current state (locked state) of the mobile terminal, into a released state according to a user's request. The user's request for releasing a locked state may be implemented in various manners. For instance, the user's request for releasing a locked state may be a touch command, a fingerprint recognition command, a facial recognition command, a gesture command, etc. In the present invention, a user's various requests for releasing a locked state may be sensed, and one or more controls may be performed according to a posture of the body sensed upon input of the touch.

Hereinafter, a method for using a touch command according to a user's request for converting a locked state into a released state will be explained. However, the present invention is not limited to this. That is, in the present invention, a fingerprint recognition command, a facial recognition command, a gesture recognition command, etc. may be also used.

Once a preset touch is applied to the screen information for releasing the locked state, the controller 180 may convert the locked state into a released state. The preset touch may be dragging of a specific graphic object output to the lock screen 500, a pattern input of a preset form, etc. The pattern input of a preset form may be a touch moving path connected from a first point to a second point on the display unit 151. Alternatively, the preset touch may be preset, or may be set by a user's selection.

If a touch for releasing the locked state is applied, the locked state may be converted into a released state, and one or more controls related to at least one of the locked state and a released state may be performed according to a posture of the body sensed upon input of a touch for releasing the locked state (S330).

In a case where the locked state is converted into a released state, the controller 180 may sense a posture of the body upon input of a touch for releasing the locked state. Then the controller 180 may perform one or more controls according to the sensed posture of the body. That is, the controller 180 may perform one or more controls according to a posture of the body.

The released state may mean a state that has been converted from the locked state. The mobile terminal which is in the released state may recognize a control command received from a user. In the released state, a specific function may be performed in response to a user's control command. For instance, if the locked state of the mobile terminal is converted into a released state by a user's touch, the controller 180 may execute one of a plurality of applications installed at the mobile terminal, in response to a user's control command.

If a user's control command with respect to the mobile terminal has not been sensed for a prescribed time, or if a preset input (e.g., press of the push key 132) is applied, the controller 180 may convert the released state into the locked state. Once the released state is converted into the locked state, the display unit 151 may be deactivated or turned off.

As aforementioned, if a touch for releasing the locked state is applied, a sensing unit (not shown) may sense a posture of the body. That is, the sensing unit may sense a posture of the body upon input of a touch for releasing the locked state.

The sensing unit may sense a posture of the body using various sensors provided at the mobile terminal. The sensors may include a gravity sensor, a geomagnetic sensor, an inertia sensor, a gyro sensor, etc.

The posture of the body sensed by the sensing unit may be variable according to a rotation angle of the body, a rotation direction of the body, a rotation speed of the body, a rotation acceleration of the body, etc.

As shown in FIG. 4A, a posture of the body may be a rotated degree of the body, with respect to a virtual axis (A-A') set on the basis of a gravitational direction. The posture of the body may be defined as a rotation angle (θ) of the body.

More specifically, as shown in FIG. 4B, a posture of the body may be a relative posture of a first direction (e.g., vertical direction) of the body, with respect to the virtual axis (A-A'). The relative posture of the first direction of the body with respect to the virtual axis (A-A') may be variable according to an angle between the body and the virtual axis (A-A'). For instance, as shown in FIGS. 4B(a) and 4B(b), the first direction of the body may be parallel to the virtual axis (A-A'). In this case, an angle between the body and the virtual axis (A-A') may be 0° or 180°.

As shown in FIGS. 4B(c) and 4B(d), the first direction of the body may be perpendicular to the virtual axis (A-A'). In this case, an angle between the body and the virtual axis (A-A') may be 90° or 270°.

Hereinafter, the present invention will be explained based on the four postures of the body shown in FIG. 4B. However, the present invention is not limited to this.

In the present invention, a posture of the body is determined based on the virtual axis (A-A'). Alternatively, a posture of the body may be determined based on a relative position with respect to a user. For instance, the mobile terminal may further include a camera unit 121 configured to receive a user's facial image. The controller 180 may determine a relative position of the body with respect to the user's facial image. That is, the controller 180 may recognize the pupil from the user's facial image, and may determine a relative position of the body with respect to the recognized pupil. In this case, the controller 180 may perform one or more controls according to the determined position of the body.

In the present invention, a posture of the body is sensed based on the virtual axis. However, in the present invention, a posture of the body may be sensed based on a relative position with respect to a user.

If a posture of the body corresponds to a first posture, the controller 180 may perform a first control. If a posture of the body corresponds to a second posture different from the first posture, the controller 180 may perform a second control different from the first control. The first control and the second control may be preset, or may be set by a user's selection.

The first control and the second control may include a control for entering a first mode and a second mode where executable functions are different from each other, and a control related to an operation of the mobile terminal such as execution of different functions among functions executable in the mobile terminal.

For instance, at least one of the first control and the second control may be a control to output a home screen page to the display unit 151 when the locked state is converted into a released state. The control to output a home screen page may mean entering a mode where functions of the mobile terminal are executable.

Icons, widgets, etc., which correspond to some applications among applications installed at the mobile terminal, may be output to the home screen page. Once a user touches an icon output to the home screen page, an application corresponding to the icon may be executed.

Figure 5A:
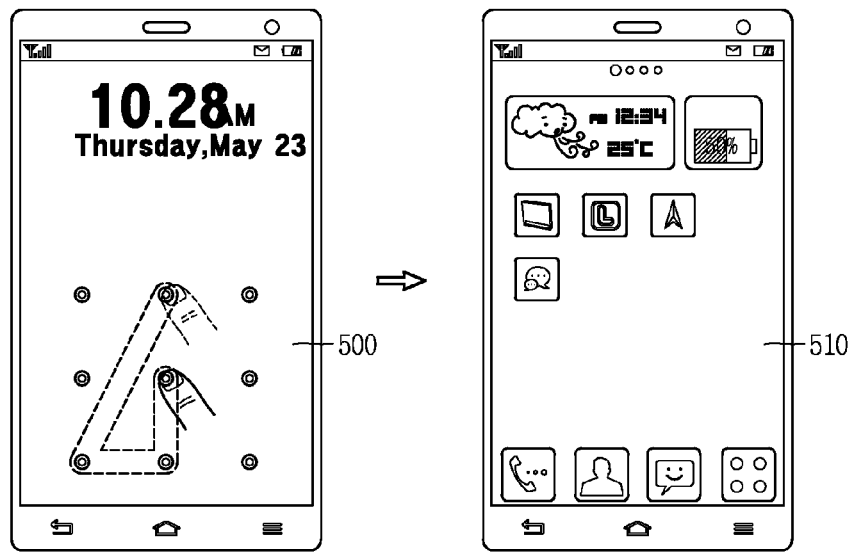
FIGS. 5A(a), 5A(b), 5B(a), 5B(b), 5C(a), 5C(b), 5D(a), 5D(b), 5E(a) and 5E(b) are conceptual views for explaining a method for controlling a mobile terminal which is in a locked state according to the present invention.
Figure 5A:
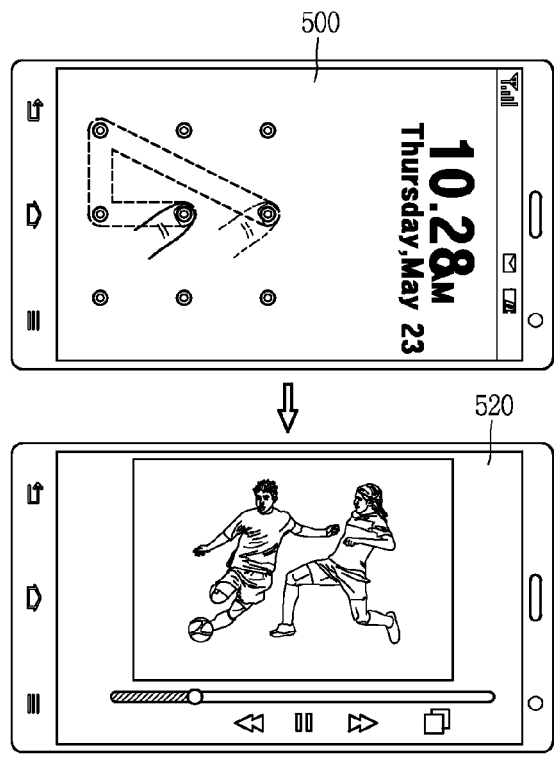

For instance, as shown in FIG. 5A(a), a posture of the body may be parallel to a virtual axis set on the basis of a gravitational direction. Upon sensing of a preset input, the display unit 151 of the mobile terminal which is in the locked state may be activated, and the lock screen 500 may be output to the display unit 151.

In order to release the locked state, a user may apply a preset touch onto screen information for releasing the locked state, the screen information output to the lock screen 500. For instance, the preset touch may be an operation to draw a path from a first point to a second point on the display unit 151. That is, the preset touch may be an operation to draw a pattern along a moving path of the touch.

After input of the touch for releasing the locked state, as shown in FIG. 5A(b), the controller 180 may convert the locked state into a released state, and may output a home screen page 510 to the display unit 151. In this case, the mobile terminal may enter a mode where at least part of a plurality of applications installed at the mobile terminal can be executed.

In the present invention, the mobile terminal may enter a mode among a plurality of modes where different functions can be performed, according to a posture of the body. More specifically, if a posture of the body corresponds to a first posture, the controller 180 may enter a first mode. If a posture of the body corresponds to a second posture, the controller 180 may enter a second mode different from the first mode. The first mode may be a mode where applications associated with the first posture are utilizable, and the second mode may be a mode where applications associated with the second posture are utilizable.

If the mobile terminal has entered one of the plurality of modes, the controller 180 may output, to the display unit 151, a graphic object corresponding to an application which is executable in the entered mode. The entered mode may be preset or may be set by a user's selection, according to a posture of the body.

Figure 5B:
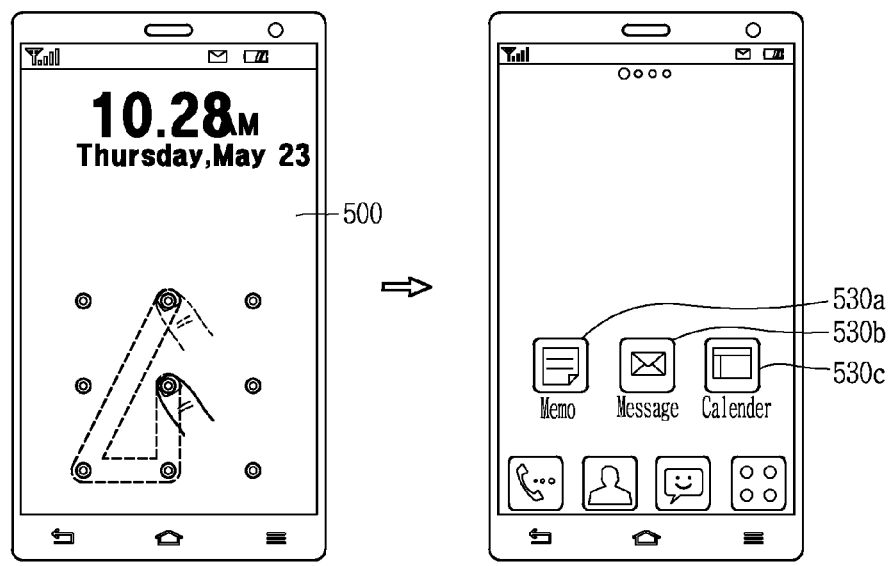
Figure 5B:
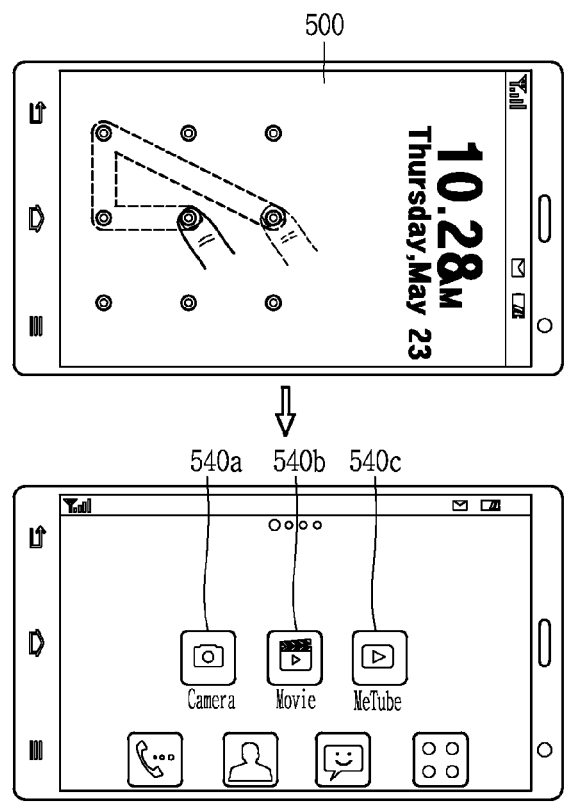

As shown in FIGS. 5B(a) and 5B(b), the mobile terminal may enter one of a first mode and a second mode where executable functions are different from each other, according to a posture of the body.

For instance, if a posture of the body corresponds to a first posture as shown in FIG. 5B(a), the controller 180 may enter a first mode where functions associated with the first posture can be performed. The first posture may be a posture where the display unit 151 has an output area long in a vertical direction.

Once the mobile terminal has entered the first mode, icons 530a, 530b and 530c of applications related to functions associated with the first posture may be output to the display unit 151. For instance, the applications related to functions associated with the first posture may include a memo application 530a, a message application 530b, a schedule application 530c, etc. each requiring an output area long in a vertical direction.

For instance, if a posture of the body corresponds to a second posture as shown in FIG. 5B(b), the controller 180 may enter a second mode where functions associated with the second posture can be performed. The second posture may be a posture where the display unit 151 has an output area wide in a horizontal direction.

Once the mobile terminal has entered the second mode, icons 540a, 540b and 540c of applications related to functions associated with the second posture may be output to the display unit 151. For instance, the applications related to functions associated with the second posture may include a camera application 540a, a moving image play application 540b, etc. each requiring an output area wide in a horizontal direction.

As another example, if the locked state is converted into a released state, at least one of the first control and the second control may be one or more controls to execute one or more applications associated with one of the first posture and the second posture. That is, the controller 180 may directly execute an application associated with one of the first posture and the second posture, without entering an additional home screen page. Upon execution of the application, an execution screen of the executed application may be output to the display unit 151.

As shown in FIG. 5A(b), when the locked state is released, the controller 180 may sense the second posture (e.g., posture of the body perpendicular to the virtual axis). An application associated with the second posture may be an application that the display unit 151 has been set to a screen wide in a horizontal direction in the second posture, e.g., an application related to playing of moving images. That is, upon sensing of the second posture, the controller 180 may convert the locked state into a released state, and may output, to the display unit 151, an execution screen 520 of the application related to playing of moving images. Under such configuration, in a locked state, a user may directly execute an application associated with a posture of the body, without an additional control command.

Figure 5C:
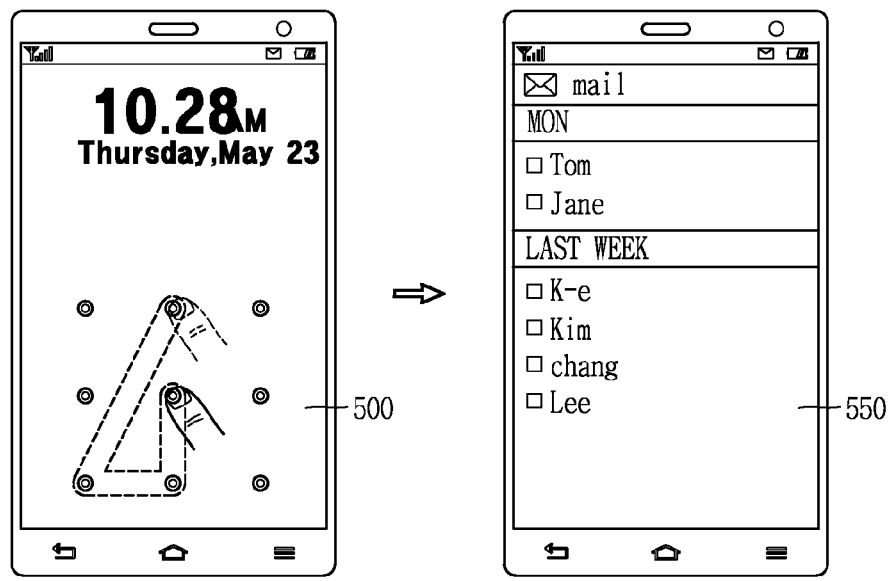
Figure 5C:
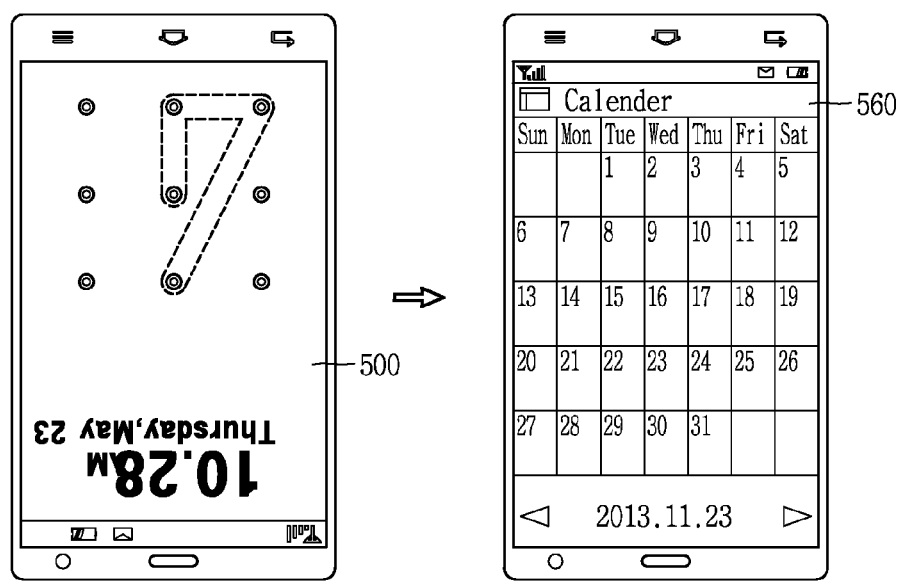
Figure 5D:
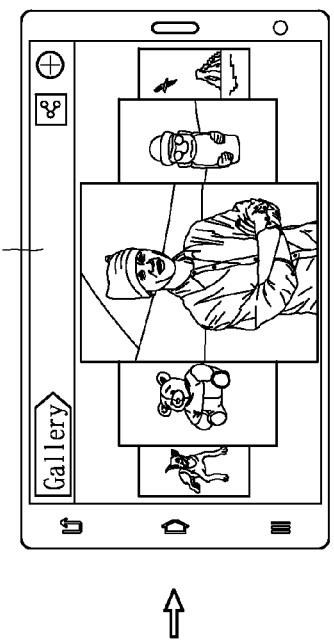
Figure 5D:
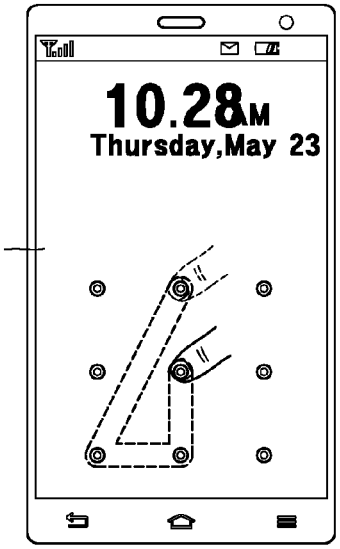
Figure 5D:
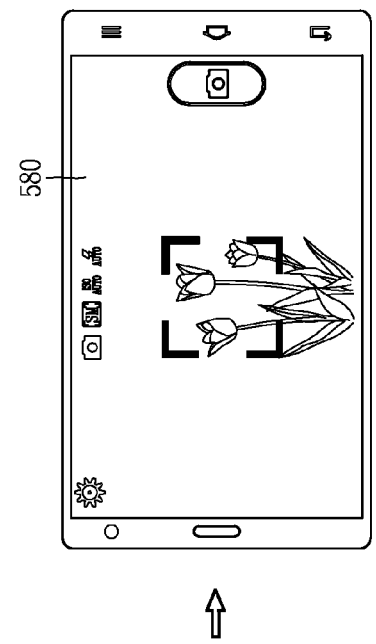
Figure 5D:
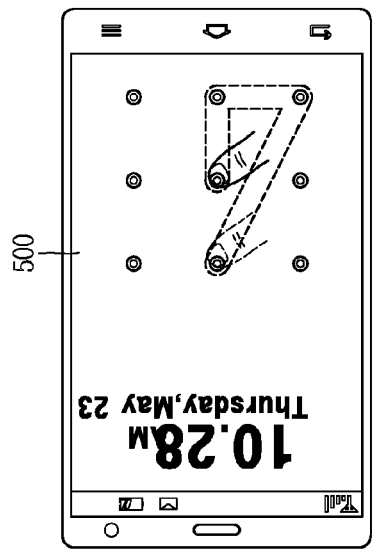

More specifically, as shown in FIGS. 5C and 5D, after input of a touch for releasing the locked state, a function corresponding to a posture of the body sensed upon input of the touch may be directly executed. The function may be preset, or may be set by a user.

A posture of the body may be parallel to a virtual axis set on the basis of a gravitational direction, or may be perpendicular to the virtual axis. A posture of the body parallel to or perpendicular to the virtual axis may be different postures according to different rotation angles.

The posture of the body parallel to the virtual axis will be explained in more detail. As shown in FIGS. 5C(a) and 5C(b), the posture of the body sensed upon input of a touch for releasing the locked state, may have a rotation angle of 0° or 180° based on the virtual axis. One of the two postures may be defined as a first posture. The first posture may be also defined as "an upright posture of the body (vertically-disposed posture)". In the first posture of the body, the display unit 151 may output information to an output area long in a vertical direction. Such state may be defined as "vertical viewing mode".

Applications associated with the first posture may be applications which can output a large amount of information (e.g., text information) at one time. For instance, the applications may include an e-mail application 550, a schedule application 560, a text application, etc. That is, upon release of the locked state, a user may directly execute an application related to output of a large amount of text information, thereby viewing the text information more conveniently in the vertical viewing mode of the display unit 151.

As another example, the posture of the body perpendicular to the virtual axis will be explained in more detail. As shown in FIGS. 5D(a) and 5D(b), the posture of the body sensed upon input of a touch for releasing the locked state, may have a rotation angle of 90° or 270° based on the virtual axis. The posture of the body perpendicular to the virtual axis may be defined as a second posture different from the first posture. Also, the posture of the body perpendicular to the virtual axis may be defined as "a laid posture of the body (horizontally-disposed posture)". In the second posture of the body, the display unit 151 may output information to an output area wide in a horizontal direction. Such state may be defined as "horizontal viewing mode". The controller 180 can determine the two postures in the second posture, according to a rotation angle of the body.

Applications associated with the second posture may be applications related to functions which can be more efficiently performed in a horizontal viewing mode, such as play of moving images. For instance, the applications may include an image output application 570, a moving image play application, a camera application 580 capable of receiving images, etc. That is, if a locked state is released in a laid posture (horizontally-disposed posture) of the mobile terminal, a user may directly execute an application which can be performed more effectively in the laid posture.

As another example, at least one of the first control and the second control may be one or more controls to output, to the lock screen 500, graphic objects corresponding to applications which can be executed according to a posture of the body. The control may be performed after input of a touch for releasing the locked state, in a case where a posture of the body is either the first posture or the second posture. The graphic objects may be output to the lock screen 500 while the locked state is maintained. That is, the controller 180 may not directly release the locked state. Rather, the controller 180 may output, to the lock screen 500, icons corresponding to different applications executable according to a posture of the body.

Figure 5E:
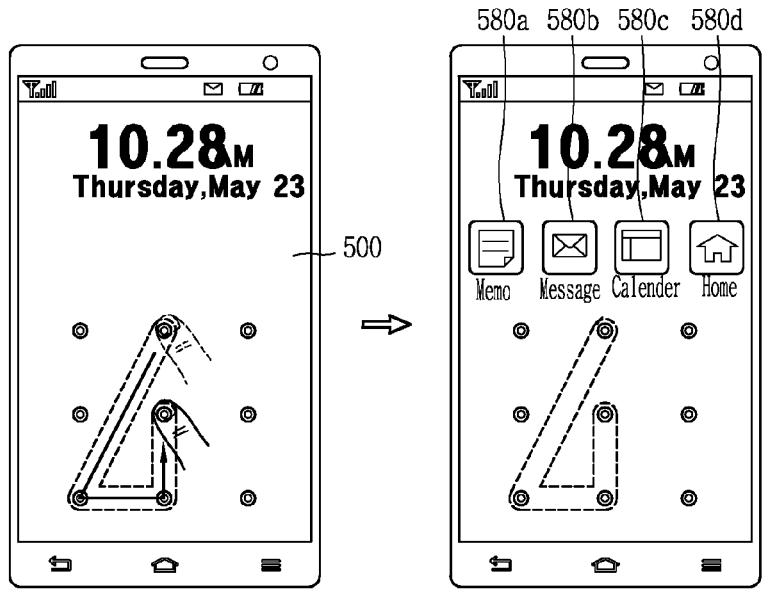
Figure 5E:
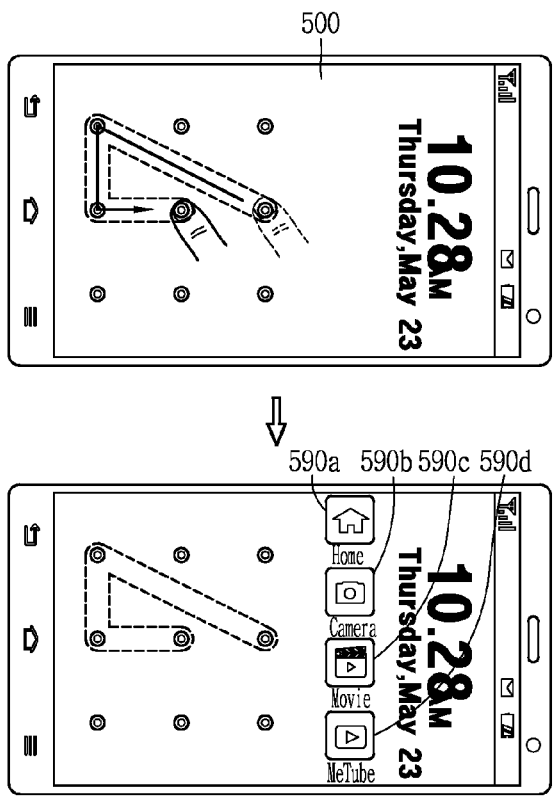

The graphic object may be output to the lock screen 500 output to the display unit 151, in an overlapping manner. As one example, as shown in FIG. 5E(a), after a touch for releasing the locked state has been input to the lock screen 500, the controller 180 may not directly release the locked state. Rather, the controller 180 may output at least one of a plurality of icons 580a, 580b, 580c to the lock screen 500 in an overlapping manner. Here, the plurality of icons 580a, 580b, 580c correspond to applications executable in the first posture of the body, among a plurality of applications installed at the mobile terminal. The icon may be output to an empty region on the lock screen 500 where information is not output. Alternatively, the icon may be output to a preset position on the lock screen 500.

One of the icons output to the lock screen 500 in an overlapping manner may be an icon 580d for entering a home screen page. That is, in the present invention, a function may be directly executed on the lock screen 500. Alternatively, a home screen page may be output to the display unit 151 without directly executing a function.

As another example, as shown in FIG. 5E(b), after a touch for releasing the locked state has been input to the lock screen 500, the controller 180 may not directly release the locked state. Rather, the controller 180 may output at least one of a plurality of icons 590b, 590c, 590d to the lock screen 500 in an overlapping manner. Here, the plurality of icons 590b, 590c, 590d correspond to applications executable in the first posture of the body, among a plurality of applications installed at the mobile terminal. The icon may be output to an empty region on the lock screen 500 in an overlapping manner, the empty region where information is not output. Alternatively, the icon may be output to a preset position on the lock screen 500. One of the icons output to the lock screen 500 in an overlapping manner may be an icon 590a for entering a home screen page.

The first control and the second control may be the aforementioned embodiments, respectively, or may be a combination of the embodiments.

So far, has been explained a method for performing one or more controls according to a sensed posture of the body when a locked state of the mobile terminal is released. In the present invention, various controls may be performed according to a posture of the body. That is, a user may execute various functions based on a posture of the body. In the present invention, upon release of a locked state, a posture of the body is controlled so that a function corresponding to the posture of the body can be directly executed without the mobile terminal's entering a home screen page. Under such configuration, a user may directly execute one or more functions after releasing the locked state.

Hereinafter, a method for performing one or more controls according to a path of a touch for releasing the locked state, as well as a posture of the body, will be explained in more detail. FIGS. 6A, 6B, 7A and 7B are conceptual views for explaining control methods when touches for releasing a locked state are different from each other, in a mobile terminal according to an embodiment of the present invention.

The memory 160 may store therein information on a plurality of touches for converting a locked state into a released state, in a case where the mobile terminal is in the locked state. For instance, the touches may be a plurality of preset pattern inputs. Each of the plurality of preset pattern inputs may correspond to control information for performing one or more controls. Such control information for performing one or more controls in correspondence to each of the plurality of preset pattern inputs may be stored in the memory 160.

If one of the plurality of preset patterns is identical to a touch pattern input to the display unit 151, the controller 180 may convert the locked state into a released state. The controller 180 may perform one or more controls according to a posture of the body sensed upon input of the preset pattern. More concretely, the controller 180 may perform one or more controls based on one of the plurality of preset patterns, and based on a posture of the body.

Figure 6A:
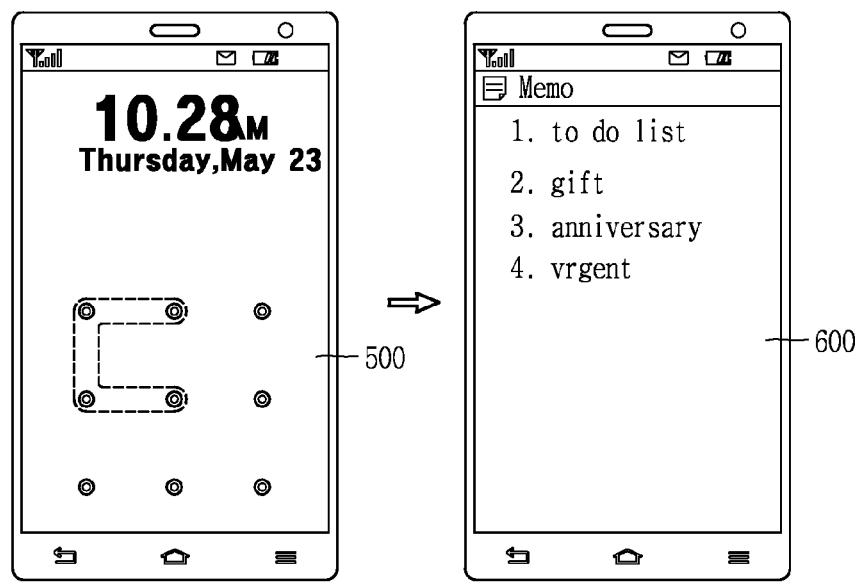
FIGS. 6A(a), 6A(b), 6B(a), 6B(b), 7A(a), 7A(b), 7B(a) and 7B(b) are conceptual views for explaining control methods when touches for releasing a locked state are different from each other, in a mobile terminal according to an embodiment of the present invention.
Figure 6A:
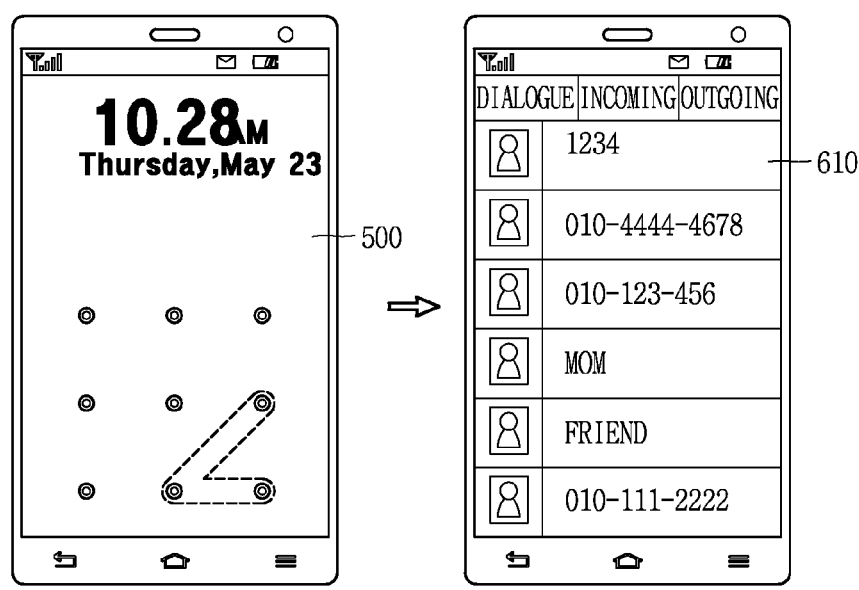

Referring to FIGS. 6A(a) and 6A(b), if touches for releasing a locked state are different from each other in the same posture of the body, the controller 180 may execute different applications. For instance, as shown in FIG. 6A(a), if a touch for releasing the locked state is applied to the lock screen 500, a memo application 600 may be executed. An execution screen of the memo application 600 may be directly output to the lock screen 500 on the display unit 151. On the other hand, as shown in FIG. 6A(b), if a touch for releasing the locked state is applied to the lock screen 500 with a different pattern from FIG. 6A(a), a message application 610 may be executed. An execution screen of the message application 610 may be directly output to the lock screen 500 on the display unit 151.

Referring to FIGS. 6B(a) and 6B(b), even if the same patterns as those of FIGS. 6A(a) and 6A(b) are applied to the lock screen 500, if the body has a different posture from FIGS. 6A(a) and 6A(b), different applications may be executed. For instance, as shown in FIG. 6B(a), if a touch for releasing the locked state is applied to the lock screen 500, a still image application 620 may be executed. On the other hand, as shown in FIG. 6B(b), if a touch for releasing the locked state is applied to the lock screen 500, a TV image (or moving image) application 630 may be execute.

Figure 7A:
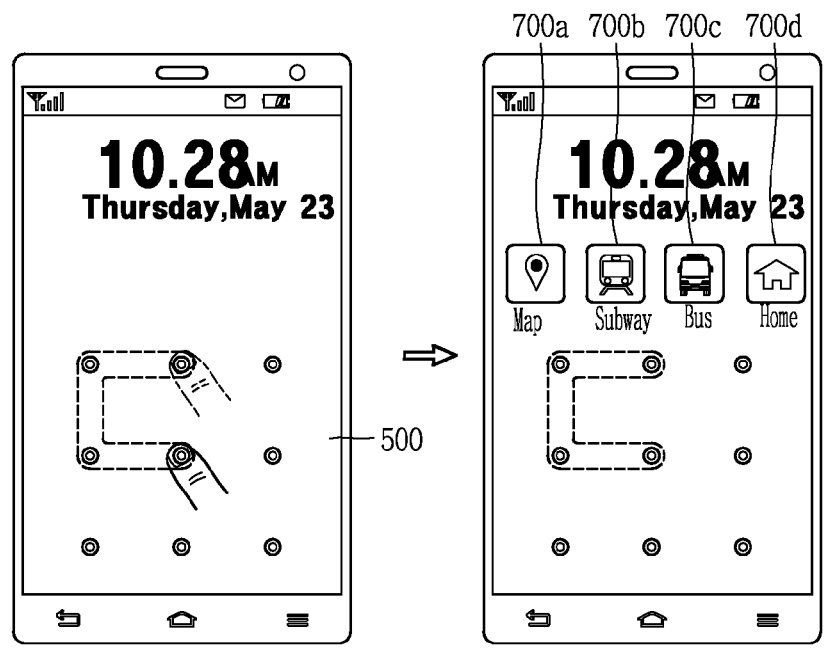
Figure 7A:
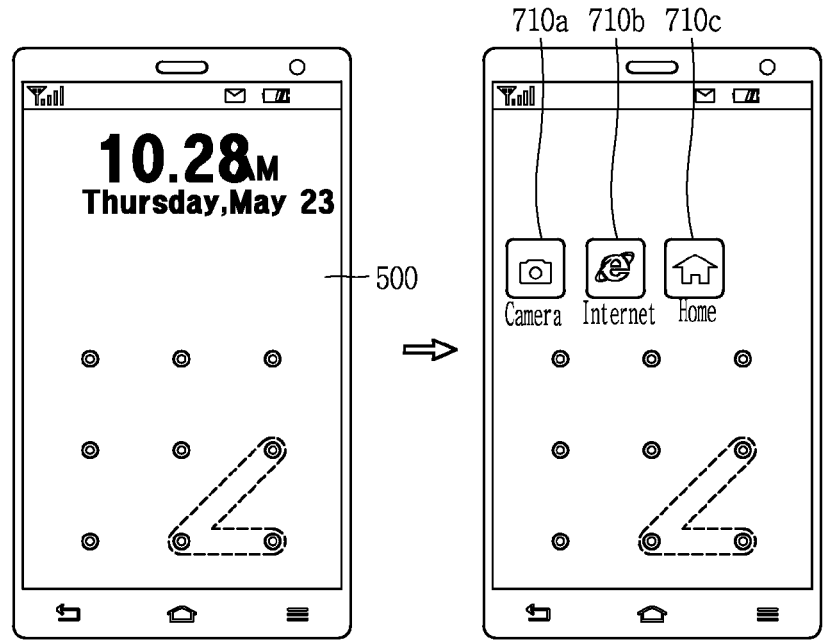

As another example, in case of outputting graphic objects corresponding to functions executable according to a posture of the body after input of touches for releasing a locked state, if the touches for releasing a locked state are different from each other, the controller 180 may output different graphic objects. Referring to FIGS. 7A and 7B, if touches for releasing a locked state are the same, the controller 180 may perform different functions according to postures of the body.

For instance, as shown in FIGS. 7A(a) and 7A(b), if a posture of the body corresponds to a first posture, and if touches for releasing a locked state are different from each other, the controller 180 may output graphic objects having different functions preset to correspond to the touches, among functions associated with the first posture. For instance, as shown in FIG. 7A(a), graphic objects 700a, 700b, 700c related to a traffic function may be output. As shown in FIG. 7A(b), graphic objects 710a, 710b related to specific functions preset by a user may be output. The controller may perform a shortcut function for directly entering a mode for the preset specific function.

Referring to FIGS. 7B(a) and 7B(b), even if touches for releasing a locked state are the same as those of FIGS. 7A(a) and 7A(b), the controller 180 may output graphic objects corresponding to different functions according to a sensed posture of the body. For instance, if the body is laid (horizontally-disposed) as shown in FIG. 7B(a), a graphic object 720a related to a moving image function may be output. Referring to FIG. 7B(b), if a locked state-releasing touch different from that of FIG. 7B(a) is applied in the same posture as FIG. 7B(a), a graphic object 730a related to TV images may be output.

As shown in FIGS. 7A and 7B, graphic objects 700d, 710c, 720b, 730b, which allow the mobile terminal to enter a home screen page regardless of a posture of the body and a pattern of a touch for releasing the locked state, may be output. Under such configuration, a user can perform a specific function, and can enter a home screen page any time.

So far, it has been explained that one or more controls are performed according to a type of a touch for releasing the locked state, as well as a posture of the body. A user may utilize more various functions through combination of a posture of the body and a pattern of a touch for releasing the locked state.

Figure 8A:
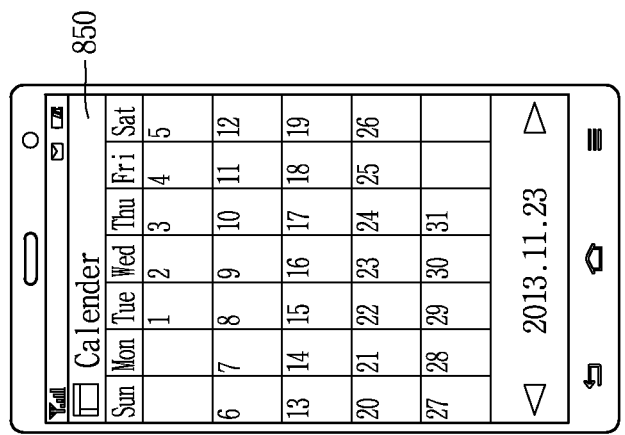
FIGS. 8A(a), 8A(b), 8A(c), 8B(a), 8B(b) and 8B(c) are conceptual views for explaining a method for executing functions associated with graphic objects output to a lock screen, in a mobile terminal according to an embodiment of the present invention.
Figure 8A:
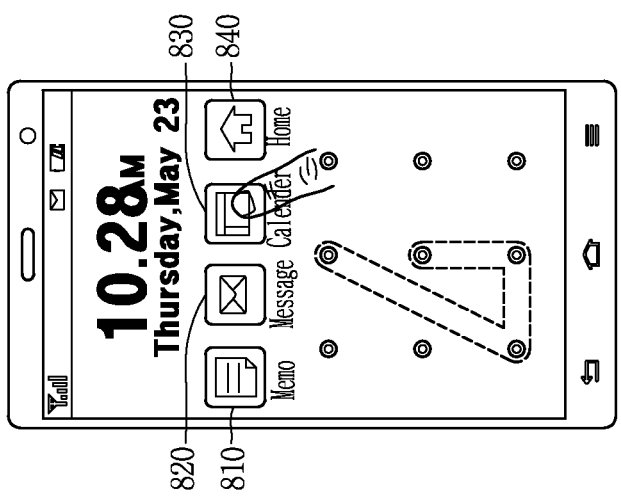
Figure 8A:
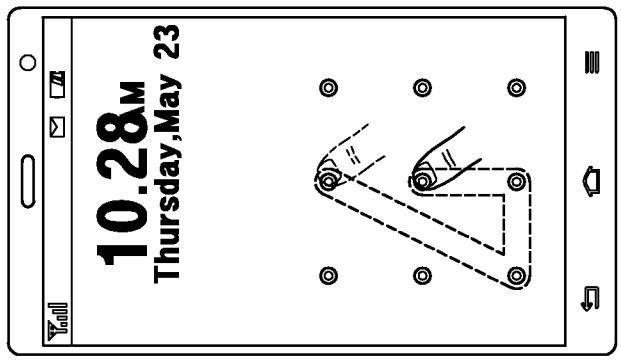
Figure 8B:
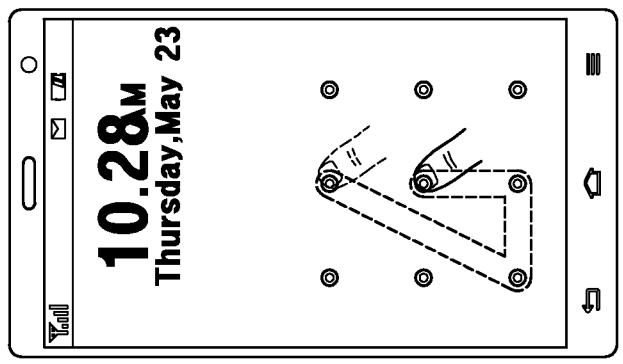
Figure 8B:
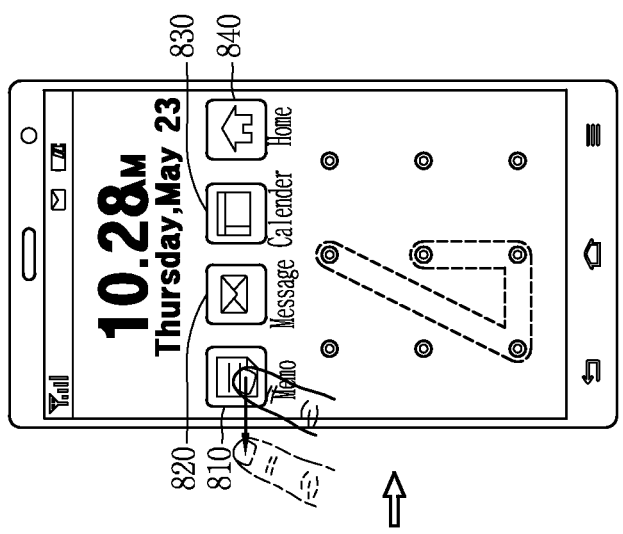
Figure 8B:
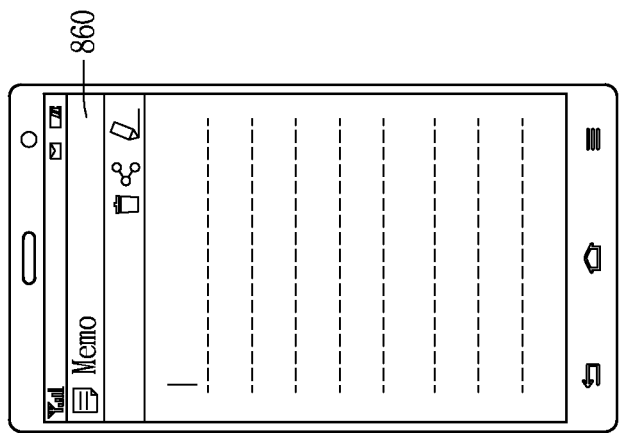

Hereinafter, will be explained a method for performing executable functions when graphic objects corresponding to the executable functions are output to the lock screen 500, while a locked state is continuously maintained, after input of a touch for releasing the locked state. FIGS. 8A and 8B are conceptual views for explaining a method for executing functions associated with graphic objects output to the lock screen 500, in a mobile terminal according to an embodiment of the present invention.

If the display unit 151 is turned on (activated) as a preset condition is satisfied in the mobile terminal which is in a locked state, the lock screen 500 associated with the locked state may be output. After a touch for releasing the locked state has been input to the lock screen 500, the controller 180 may output, to the lock screen 500, a graphic object corresponding to a function executable in the current posture of the body. That is, a user may execute the function without entering a home screen page.

The user may execute a function corresponding to the graphic object, by applying a preset touch onto the graphic object. The preset touch may be set by a user, or may be preset. The preset touch may be long touch, double touch, flicking, dragging, etc. with respect to the graphic object.

Once the preset touch is applied to the graphic object, the controller 180 may perform a function corresponding to the touched graphic object. That is, the controller 180 may directly execute one or more functions without entering a home screen page.

For instance, as shown in FIGS. 8A(a) and 8A(b), if a touch for releasing the locked state is applied to the lock screen 500, the controller 180 may output, to the lock screen 500, graphic objects 810, 820, 830, 840 corresponding to functions executable in the current posture of the body.

If a preset touch is applied to one 830 of the graphic objects 810, 820, 830, 840, the controller 180 may directly execute a function corresponding to the graphic object 830. For instance, the preset touch may be a long touch. That is, once a long touch is applied to the graphic object, the controller 180 may directly execute the function (850) without entering a home screen page as shown in FIG. 8A(c).

As another example, as shown in FIG. 8B(b), if a user applies a flicking input to one 810 of the graphic objects 810, 820, 830, 840, the controller 180 may directly execute a function corresponding to the graphic object 810. The flicking input may be performed, toward outside, from an output area of the display unit 151.

So far, a method for executing functions corresponding to graphic objects output to the lock screen 500 has been explained. In the present invention, one or more functions may be directly executed (860) on the lock screen 500, without the mobile terminal's entering a home screen page as shown in FIG. 8B(c).

Hereinafter, will be explained a method for converting a locked state into a released state, and then controlling one or more functions based on position information of the mobile terminal which is in the locked state. FIG. 9 is a conceptual view for explaining a method for controlling one or more functions executable upon release of a locked state, by receiving position information of the mobile terminal which is in the locked state.

The mobile terminal according to an embodiment of the present invention may further include a position receiving unit configured to receive position information of the body. The position information may be received in various manners. For instance, the position receiving unit may receive position information of the body by a Global Position System (GPS).

Upon release of a locked state, the controller 180 may perform a control related to position information received by the position receiving unit. That is, the controller 180 may execute one or more functions related to position information of the mobile terminal upon release of a locked state. Alternatively, the controller 180 may output graphic objects 900a, 900b, 900c, 900d, 900e, 900f corresponding to applications related to the position information, among a plurality of applications installed at the mobile terminal.

For instance, if the position information relates to a company, the controller 180 may output graphic objects corresponding to company-related applications, e.g., a document application, an e-mail application, etc. That is, the controller 180 may output applications recommendable to a user by sensing the user's current position. The recommendable applications may be set by a user's selection. Alternatively, applications which satisfy preset conditions such as a user's usage frequency may be automatically set.

Figure 9C:
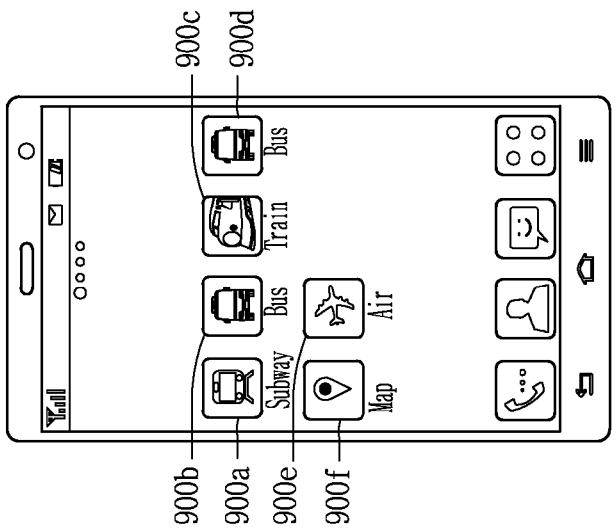
FIGS. 9(a), 9(b) and 9(c) are conceptual views illustrating a method for releasing a locked state of a mobile terminal according to an embodiment of the present invention, based on a position of the mobile terminal.
Figure 9B:
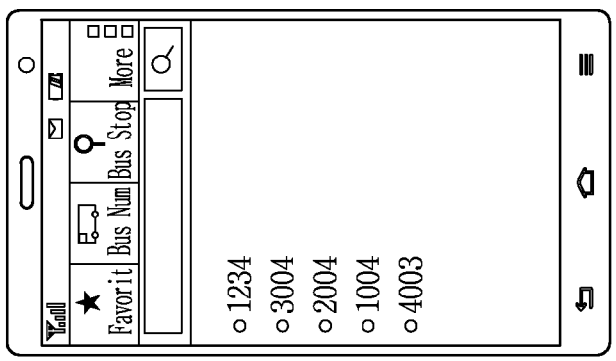
Figure 9A:
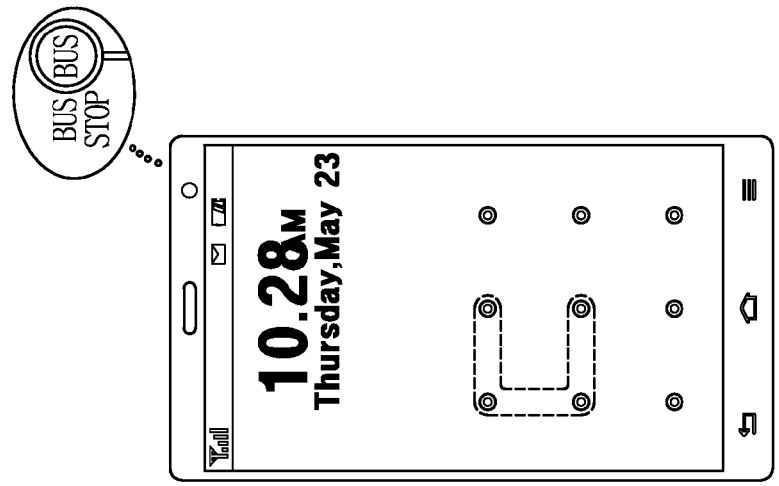

For instance, as shown in FIG. 9(a), if a preset condition (e.g., push key input) is satisfied in the mobile terminal which is in a locked state, the controller 180 may output the lock screen 500 to the display unit 151.

In a state where the lock screen 500 has been output, the controller 180 may determine a current position of the mobile terminal as a bus stop, using the position receiving unit. If a touch for releasing the locked state is applied when the mobile terminal is currently at a bus stop, the controller 180 may convert the locked state into a released state, and may perform one or more controls based on the position information. For instance, as shown in FIG. 9(b), the controller 180 may directly execute a bus stop application. As shown in FIG. 9(c), the controller 180 may output graphic objects 900a, 900b, 900c, 900d, 900e, 900f corresponding to the bus stop application. For instance, the bus stop application may be a traffic-related application such as a subway application and a train application.

Although not shown, the controller 180 may output notification information inquiring whether to use position information, at the time of converting the locked state into a released state. The notification information may be output to the lock screen 500 in an overlapping manner.

If a user selects an icon for using position information, the controller 180 may perform controls using position information. On the other hand, if a user selects an icon for not using position information, the controller 180 may perform controls not using position information.

So far, has been explained a method for controlling the mobile terminal when converting a locked state into a released state based on position information of the mobile terminal. In the present invention, a user may directly execute functions related to position information, upon release of a locked state of the mobile terminal.

Figure 10A:
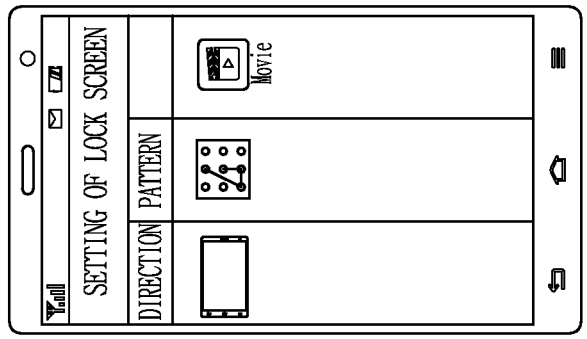
FIGS. 10(a), 10(b) and 10(c) are conceptual views illustrating a method for performing a locked-state releasing function in a mobile terminal according to an embodiment of the present invention.

Hereinafter, a method for setting one or more controls executable when a locked state is converted into a released state will be explained. FIG. 10 is a conceptual view illustrating a method for setting controls performed when a locked state is converted into a released state in a mobile terminal according to an embodiment of the present invention.

The controller 180 may receive a user's selection with respect to controls performed when a locked state is converted into a released state. First of all, as shown in FIG.

10(a), a step of setting a posture of the body may be performed. In drawings, four postures of the body are shown for selection. However, the present invention is not limited to this. That is, a user may set a tilted angle of the body.

Figure 10B:
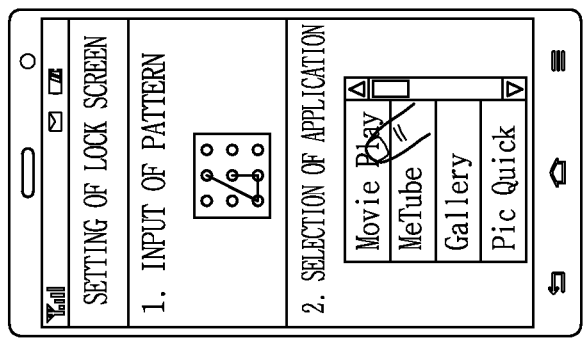

Then as shown in FIG. 10(b), a step of setting a touch pattern for releasing a locked state may be performed. The user may directly set his or her desired pattern. Upon setting of the posture of the body and the pattern, the user may set one or more functions executable according to the set posture and pattern. That is, if a posture of the body is set and then a touch pattern is input, at least one executable application may be selected from a plurality of applications installed at the mobile terminal.

In the present invention, the step of setting a posture of the body is firstly performed, and then the step of inputting a touch pattern is performed. However, the step of inputting a touch pattern may be firstly performed, and then the step of setting a posture of the body may be performed.

Figure 10C:
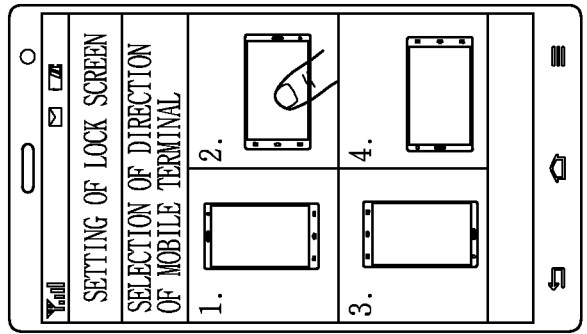

Then as shown in FIG. 10(c), information on the set posture of the body, the set pattern and the set application may be output to the display unit 151.

So far, has been explained a method for setting one or more controls executable when a locked state is converted into a released state. In the present invention, a user may perform various controls using various conditions, i.e., a posture of the body, a pattern for releasing a locked state, etc.

Figure 11A:
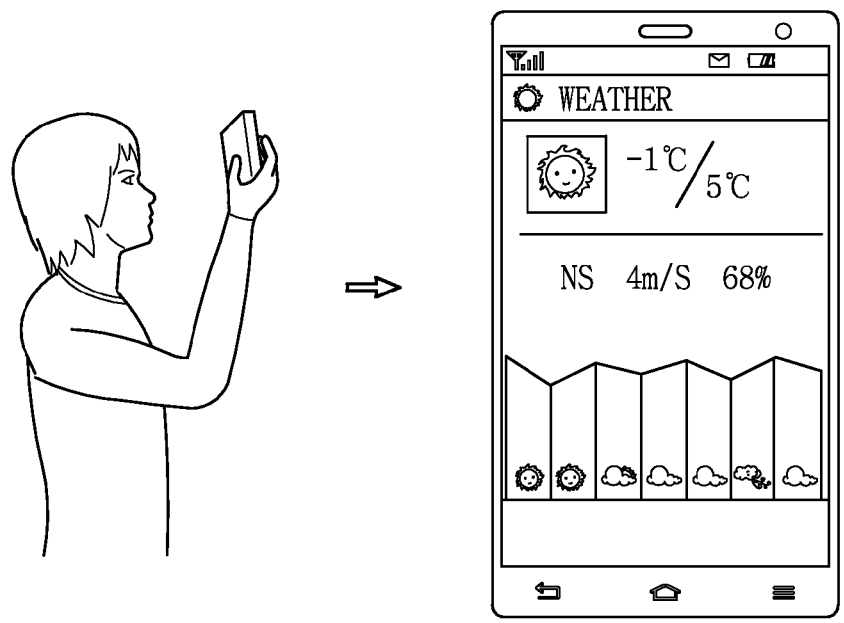
FIGS. 11A(a), 11A(b) and 11B are conceptual views illustrating a method for performing one or more controls based on a tilted degree of a body, in a mobile terminal according to an embodiment of the present invention.
Figure 11A:
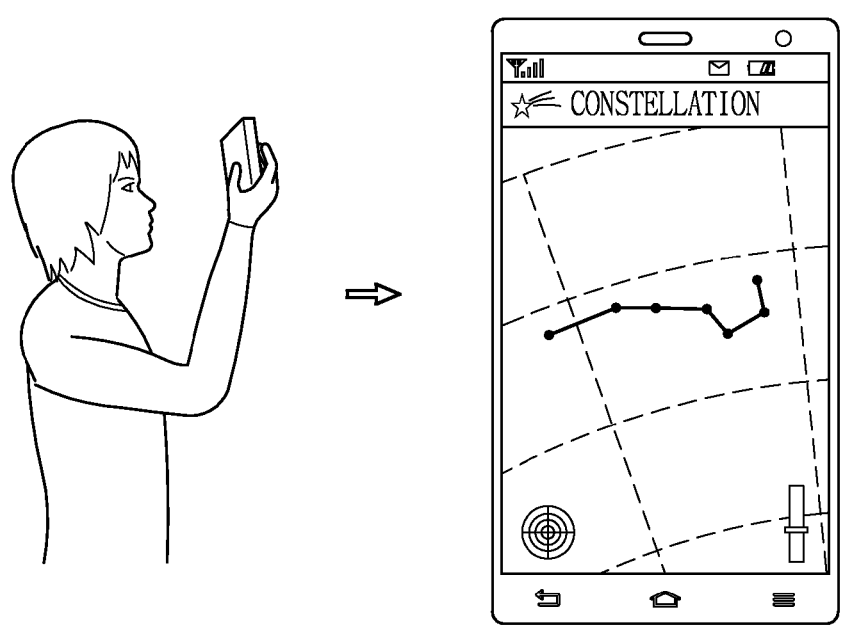
Figure 11B:
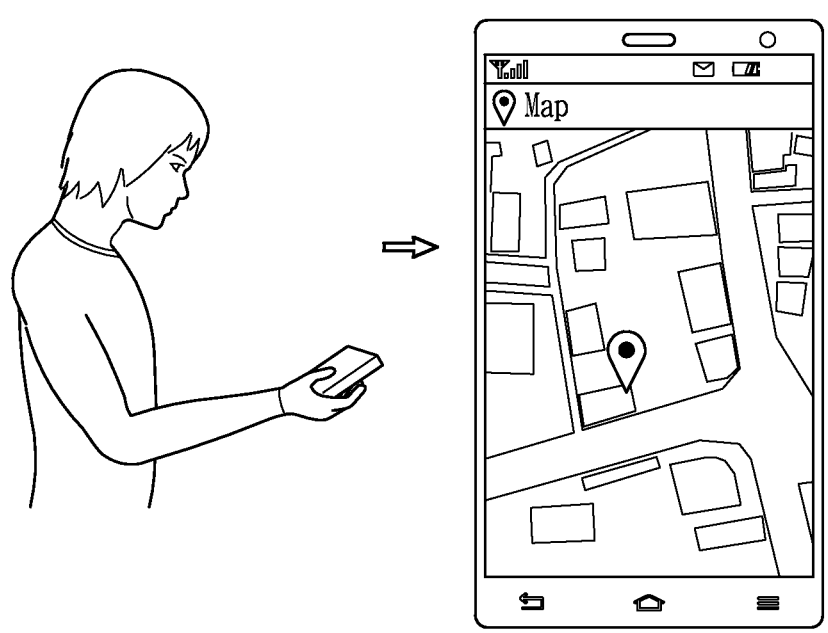

Hereinafter, will be explained a method for executing different functions based on a tilted degree of the mobile terminal, in case of converting a locked state into a released state. FIGS. 11A and 11B are conceptual views illustrating a method for performing one or more controls according to a tilted degree of the body, in a mobile terminal according to an embodiment of the present invention.

Upon release of a locked state, the controller 180 may perform one or more controls according to various statuses of the mobile terminal. Status information may be received by various sensors provided at the mobile terminal. For instance, the status information may be received by a position receiving unit for receiving position information, a sensing unit for sensing a tilted degree of the mobile terminal, a wireless communication unit for sensing whether the mobile terminal has communicated with outside, etc. The status information may be also information on an application being currently executed, information on a current time, etc.

As shown in FIG. 11A, the controller 180 may perform different functions according to a tilted degree of the mobile terminal and a current time. That is, the controller 180 may perform different functions according to whether the rear camera 121b has been tilted upward or downward.

Referring to FIG. 11A(a), a user may tilt the mobile terminal so that the rear camera 121b can be toward the sky. The rear camera 121b may be activated when a locked state of the mobile terminal is converted into a released state. Once an image of the sky is received from the activated rear camera 121b, an application related to the received image (e.g., application about weather information) may be executed. In this case, if a current time stored in the mobile terminal corresponds to the day (e.g., 09:00 AM~03:00 PM), the controller 180 may output an execution screen related to the day (FIG. 11A(a)). On the other hand, if the current time stored in the mobile terminal corresponds to the night (e.g., 06:00 PM~11:00 PM), the controller 180 may output an execution screen related to the night (FIG. 11A(b)).

Referring to FIG. 11B, a user may tilt the mobile terminal so that the rear camera 121b can be toward the floor. If a locked state is converted into a released state, the controller 180 may execute an application pre-matched with the tilted degree. That is, if a locked state is converted into a released state, the rear camera 121b may be activated to receive an image of the floor. Then the controller 180, which has received the image of the floor, may execute an application pre-matched with the image of the floor (e.g., map application).

Upon release of a locked state, whether to perform different functions according to various statuses of the mobile terminal may be performed by a user's selection. That is, upon release of a locked state, the controller 180 may output notification information inquiring whether to perform one or more controls according to a status of the mobile terminal.

So far, has been explained a method for controlling the mobile terminal according to a status of the mobile terminal, upon release of a locked state. In the present invention, upon release of a locked state, a user can use a function suitable for his or her current status in a more convenient manner.

In the present invention, when a locked state of the mobile terminal is converted into a released state as a touch for releasing the locked state is applied to the mobile terminal, one or more controls may be performed based on a posture of the body. Under such configuration, when a locked state is converted into a released state, the mobile terminal can not only enter a home screen page, but also perform various controls.

In the present invention, when a locked state of the mobile terminal is converted into a released state, a function preset based on a posture of the body can be immediately executed. Under such configuration, a user can immediately execute a function without an additional control command, after a locked state is converted into a released state.

In the present invention, after input of a touch for releasing the locked state, graphic objects, which correspond to functions executable in a posture of the body sensed upon input of the touch, are output. Under such configuration, a user can immediately execute one or more functions without the mobile terminal's entering a home screen page.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a body;
   a sensing unit;
   a display configured to display information; and
   a controller configured to:
      cause the display to display a lock screen when the mobile terminal is in a locked state;
      cause the display to display at least one graphic object corresponding to at least one executable application on the lock screen in response to a first touch input applied to the display while the lock screen is displayed, wherein the at least one executable application is determined based on a pattern of the first touch input and an orientation of the body sensed by the sensing unit at the time the first touch input is applied to the display; and
      perform an operation associated with one graphic object selected from the at least one graphic object in response to a second touch input applied to the display via the one graphic object while the mobile terminal is in the locked state,
   wherein:
      the at least one graphic object comprises a first graphic object corresponding to a first application when the first touch input comprises a first preset pattern and when the first touch input is applied while the body is in a first orientation;
      the at least one graphic object comprises a second graphic object corresponding to a second application when the first touch input comprises a second preset pattern and when the first touch input is applied while the body is in the first orientation;
      the at least one graphic object comprises a third graphic object corresponding to a third application when the first touch input comprises the first preset pattern and when the first touch input is applied while the body is in a second orientation; and
      the at least one graphic object comprises a fourth graphic object corresponding to a fourth application when the first touch input comprises the second preset pattern and when the first touch input is applied while the body is in the second orientation.

2. The mobile terminal of claim 1, wherein the locked state is maintained after the first touch input is applied and until the second touch input is applied.

3. The mobile terminal of claim 1, wherein:
   the orientation of the body is sensed based on a virtual axis set according to a gravitational direction;
   a first direction of the body is parallel to the virtual axis in the first orientation; and
   the first direction of the body is perpendicular to the virtual axis in the second orientation.

4. The mobile terminal of claim 1, further comprising a camera, wherein the controller is further configured to cause the display to display:
   a first execution screen in response to a third touch input when the third touch input is applied to the display while the body is tilted by a first predetermined angle such that the camera is directed to a first direction according to the first predetermined angle; and
   a second execution screen in response to a fourth touch input when the fourth touch input is applied to the display while the body is tilted by a second predetermined angle such that the camera is directed to a second direction according to the second predetermined angle.

5. The mobile terminal of claim 4, wherein:
   the controller is further configured to cause the display to display:
      the first execution screen when the third touch input is applied while the body is tilted by the first predetermined angle during a first period of day; and
      a third execution screen when the third touch input is applied while the body is tilted by the first predetermined angle during a second period of day.

6. The mobile terminal of claim 1, wherein the controller is further configured to:
   perform a first operation associated with the first application when the second touch input is applied to the display via the first graphic object; and
   perform a second operation associated with the second application when the second touch input is applied to the display via the second graphic object.

7. The mobile terminal of claim 1, wherein the controller is further configured to:
   execute the first application in response to selection of the first graphic object by the second touch input among a first plurality of graphic objects; and
   execute the second application in response to selection of the second graphic object by the second touch input among a second plurality of objects.

8. The mobile terminal of claim 1, wherein:
   the at least one graphic object further comprises a fifth graphic object for displaying a home screen page regardless of the pattern of the first touch input and the orientation of the body in addition to the first, second, third, or fourth graphic object; and
   the controller is further configured to cause the display to display the home screen page in response to a third touch input applied to the fifth graphic object while both the first, second, third, or fourth graphic object and the fifth graphic object are displayed on the lock screen.

9. The mobile terminal of claim 8, wherein the controller is further configured to cause the display to display different sets of objects based on the sensed orientation of the body such that:
   a first set of graphic objects corresponding to applications associated with the first orientation and the first preset pattern is displayed when the first touch input comprising the first preset pattern is applied while the body is in the first orientation;
   a second set of graphic objects corresponding to applications associated with the first orientation and the second preset pattern is displayed when the first touch input comprising the second preset pattern is applied while the body is in the first orientation;
   a third set of graphic objects corresponding to applications associated with the second orientation and the first preset pattern is displayed when the first touch input comprising the first preset pattern is applied while the body is in the second orientation; and
   a fourth set of graphic objects corresponding to applications associated with the second orientation and the second preset pattern is displayed when the first touch input comprising the second preset pattern is applied while the body is in the second orientation, and
   wherein each of the first set, second set, third set, and fourth set comprises the fifth graphic object.

10. The mobile terminal of claim 1, wherein the controller is further configured to cause the display to display the at least one graphic object in an overlapping manner such that the at least one graphic object is displayed on a part of the lock screen without transitioning the mobile terminal from the locked state to a released state.

11. The mobile terminal of claim 10, wherein:
the at least one executable application comprises a plurality of executable applications such that a plurality of graphic objects each associated with one of the plurality of executable applications are displayed in response to the first touch input; and
the controller is further configured to transition from the locked state to the released state and execute the associated application in response to the second touch input applied to one of the plurality of graphic objects, the second touch input following the first touch input.

12. The mobile terminal of claim 11, wherein the plurality of graphic objects always comprise a graphic object for entering a home screen page.

13. The mobile terminal of claim 1, further comprising a memory configured to store a plurality of preset patterns associated with touch inputs,
wherein the controller is further configured to:
cause the memory to store the first preset pattern and the second preset pattern of the plurality of preset patterns;
recognize the orientation of the body sensed by the sensing unit;
recognize one of the plurality of preset patterns in the first touch input; and
cause the display to display graphic objects corresponding to the recognized one of the plurality of preset patterns on a portion of the lock screen in an overlapping manner based on the recognized orientation of the body.

14. The mobile terminal of claim 13, wherein one of the plurality of preset patterns is a third preset pattern for causing the controller to transition from the locked state to a released state and to cause the display to display a home screen page regardless of the orientation of the body such that the at least one graphic object is not displayed when the first touch input comprises the third preset pattern.

15. The mobile terminal of claim 13, wherein the controller is further configured to cause the display to display a user interface for setting the at least one executable application to map a preset orientation of the body and a touch pattern set by a user via the user interface to the at least one executable application.

16. The mobile terminal of claim 1, further comprising a position receiving unit,
wherein the controller is further configured to:
obtain position information indicating a position of the mobile terminal via the position receiving unit; and
execute a function related to the position information in response to the first touch input when the position corresponds to a preset position and the mobile terminal is set to use the position information to transition from the locked state to a released state and to directly execute the function upon the transitioning.

17. A method for controlling a mobile terminal, the method comprising:
displaying a lock screen on a display of the mobile terminal when the mobile terminal is in a locked state;
displaying at least one graphic object corresponding to at least one executable application on the lock screen in response to a first touch input applied to the display while the lock screen is displayed, wherein the at least one executable application is determined based on a pattern of the first touch input and an orientation of the body sensed by a sensing unit at the time the first touch input is applied to the display; and
performing an operation associated with one graphic object selected from the at least one graphic object in response to a second touch input applied to the display via the one graphic object while the mobile terminal is in the locked state,
wherein:
the at least one graphic object comprises a first graphic object corresponding to a first application when the first touch input comprises a first preset pattern and when the first touch input is applied while the body is in a first orientation;
the at least one graphic object comprises a second graphic object corresponding to a second application when the first touch input comprises a second preset pattern and when the first touch input is applied while the body is in the first orientation;
the at least one graphic object comprises a third graphic object corresponding to a third application when the first touch input comprises the first preset pattern and when the first touch input is applied while the body is in a second orientation; and
the at least one graphic object comprises a fourth graphic object corresponding to a fourth application when the first touch input comprises the second preset pattern and when the first touch input is applied while the body is in the second orientation.

18. The method of claim 17, wherein:
the orientation of the body is sensed based on a virtual axis set according to a gravitational direction of the body;
a first direction of the body is parallel to the virtual axis in a first orientation; and
the first direction of the body is perpendicular to the virtual axis in a second orientation.

19. The method of claim 18, further comprising:
recognizing an angle between the body and the virtual axis sensed at the time the first touch input is applied as a preset angle; and
transitioning from the locked state to a released state and executing a function corresponding to the preset angle, instead of displaying the at least one graphic object, in response to the first touch input applied as the preset angle.

20. The method of claim 17, wherein:
the at least one graphic object further comprises a fifth graphic object for displaying a home screen page regardless of the pattern of the first touch input and the orientation of the body in addition to the first, second, third, or fourth graphic object;
the controller is further configured to cause the display to display the home screen page in response to a third touch input applied to the fifth graphic object while both the first, second, third, or fourth graphic object and the fifth graphic object are displayed on the lock screen; and
the at least one graphic object always comprises the fifth graphic object.

* * * * *